(12) United States Patent
Dasgupta et al.

(10) Patent No.: US 9,906,425 B2
(45) Date of Patent: Feb. 27, 2018

(54) SELECTIVE AND DYNAMIC APPLICATION-CENTRIC NETWORK MEASUREMENT INFRASTRUCTURE

(71) Applicant: Cisco Technology, Inc., San Jose, CA (US)

(72) Inventors: Sukrit Dasgupta, Norwood, MA (US); Jean-Philippe Vasseur, Saint Martin d'Uriage (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 247 days.

(21) Appl. No.: 14/591,072

(22) Filed: Jan. 7, 2015

(65) Prior Publication Data

US 2016/0028608 A1  Jan. 28, 2016

Related U.S. Application Data

(60) Provisional application No. 62/028,248, filed on Jul. 23, 2014.

(51) Int. Cl.
*H04L 12/28* (2006.01)
*H04L 12/26* (2006.01)

(52) U.S. Cl.
CPC ........ *H04L 43/0894* (2013.01); *H04L 43/103* (2013.01); *H04L 43/16* (2013.01); *H04L 43/0805* (2013.01); *H04L 43/0852* (2013.01)

(58) Field of Classification Search
CPC . H04L 43/16; H04L 43/0894; H04L 43/0805; H04L 43/0852; H04L 43/103

USPC .................. 370/229, 238, 252; 709/227–241
See application file for complete search history.

(56) References Cited

U.S. PATENT DOCUMENTS

| | | | | |
|---|---|---|---|---|
| 7,768,929 B2 * | 8/2010 | Karacali-Akyamac | | H04L 12/2602 370/241 |
| 8,116,200 B2 * | 2/2012 | Tychon | ................. | H04L 45/125 370/231 |
| 8,189,482 B2 * | 5/2012 | Vasseur | ............... | H04L 12/5695 370/238 |
| 8,300,538 B2 * | 10/2012 | Kim | ...................... | H04L 45/124 370/238 |
| 8,533,317 B2 * | 9/2013 | Muthiah | ............... | G06F 9/5055 709/201 |
| 8,670,326 B1 * | 3/2014 | Balasubramanian | ... | H04L 45/22 370/238 |

(Continued)

OTHER PUBLICATIONS

Sajassi et al., "BGP MPLS Based Ethernet VPN", Network Working Group Internet-Draft, <draft-ietf-l2vpn-evpn-11>, Oct. 18, 2014, 52 pages, Internet Engineering Task Force Trust.

*Primary Examiner* — Man Phan
(74) *Attorney, Agent, or Firm* — Parker Ibrahim & Berg LLC; James M. Behmke; Stephen D. LeBarron (57) ABSTRACT

In one embodiment, a device in a network receives data indicative of traffic characteristics of traffic associated with a particular application. The device identifies one or more paths in the network via which the traffic associated with the particular application was sent, based on the traffic characteristics. The device determines a probing schedule based on the traffic characteristics. The probing schedule simulates the traffic associated with the particular application. The device sends probes along the one or more identified paths according to the determined probing schedule.

17 Claims, 7 Drawing Sheets

(56) References Cited

U.S. PATENT DOCUMENTS

| | | | | |
|---|---|---|---|---|
| 8,817,649 B2* | 8/2014 | Dong | ............... | H04L 43/024 |
| | | | | 370/252 |
| 8,885,632 B2* | 11/2014 | Hughes | ............... | H04L 45/24 |
| | | | | 370/229 |
| 2006/0215577 A1* | 9/2006 | Guichard | ............ | H04L 12/2697 |
| | | | | 370/254 |
| 2015/0332155 A1* | 11/2015 | Mermoud | ............ | G06N 99/005 |
| | | | | 706/12 |
| 2015/0333997 A1* | 11/2015 | Mermoud | ............... | H04L 43/12 |
| | | | | 370/252 |

* cited by examiner

SELECTIVE AND DYNAMIC APPLICATION-CENTRIC NETWORK MEASUREMENT INFRASTRUCTURE

RELATED APPLICATIONS

This application claims priority to U.S. Provisional Application No. 62/028,248, filed Jul. 23, 2014, entitled: "SELECTIVE AND DYNAMIC APPLICATION-CENTRIC NETWORK MEASUREMENT INFRASTRUCTURE," by Dasgupta et al., the contents of which are herein incorporated by reference.

TECHNICAL FIELD

The present disclosure relates generally to computer networks, and, more particularly, to a selective and dynamic application-centric network measurement infrastructure.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

As the number of business and non-business critical applications increases, so too are the number and variety of service level agreements (SLAs) that may be in use by a network. In general, an SLA refers to a target or threshold level of performance guaranteed by the network, and may be associated with a particular type of traffic. For example, many real-time business applications are very bandwidth demanding and having corresponding SLAs that are used to ensure that a certain amount of network bandwidth is available for a particular flow of traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network receives data indicative of traffic characteristics of traffic associated with a particular application. The device identifies one or more paths in the network via which the traffic associated with the particular application was sent, based on the traffic characteristics. The device determines a probing schedule based on the traffic characteristics. The probing schedule simulates the traffic associated with the particular application. The device sends probes along the one or more identified paths according to the determined probing schedule.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
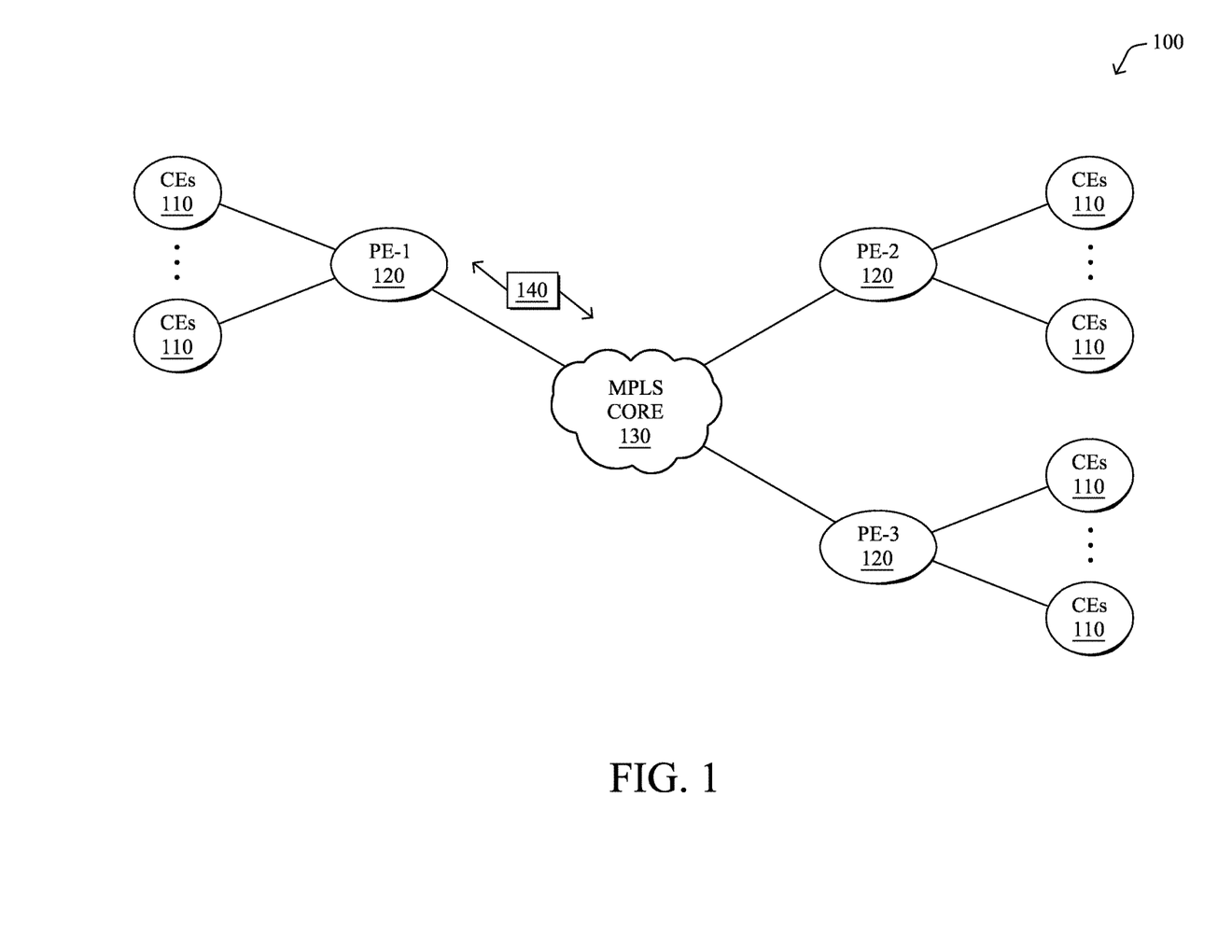
FIG. 1 illustrates an example communication network.

FIG. 1 is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative Multi-Protocol Label Switching (MPLS) core network 130. Alternatively, or in addition to, routers 110, 120 may be interconnected across a public Internet network. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router (or a set of routers) may be connected to a private network (e.g., dedicated leased lines, an optical network, etc.) or a virtual private network (VPN), such as an MPLS VPN thanks to a carrier network, via one or more links exhibiting very different network and SLA characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

As will be appreciated, the above topologies are illustrative only and the techniques herein may be used in any other form of computer network. For example, the techniques herein may be adapted for use in a mesh network, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point). Often, an IoT network is implemented with an LLN-like architecture.

Figure 2:
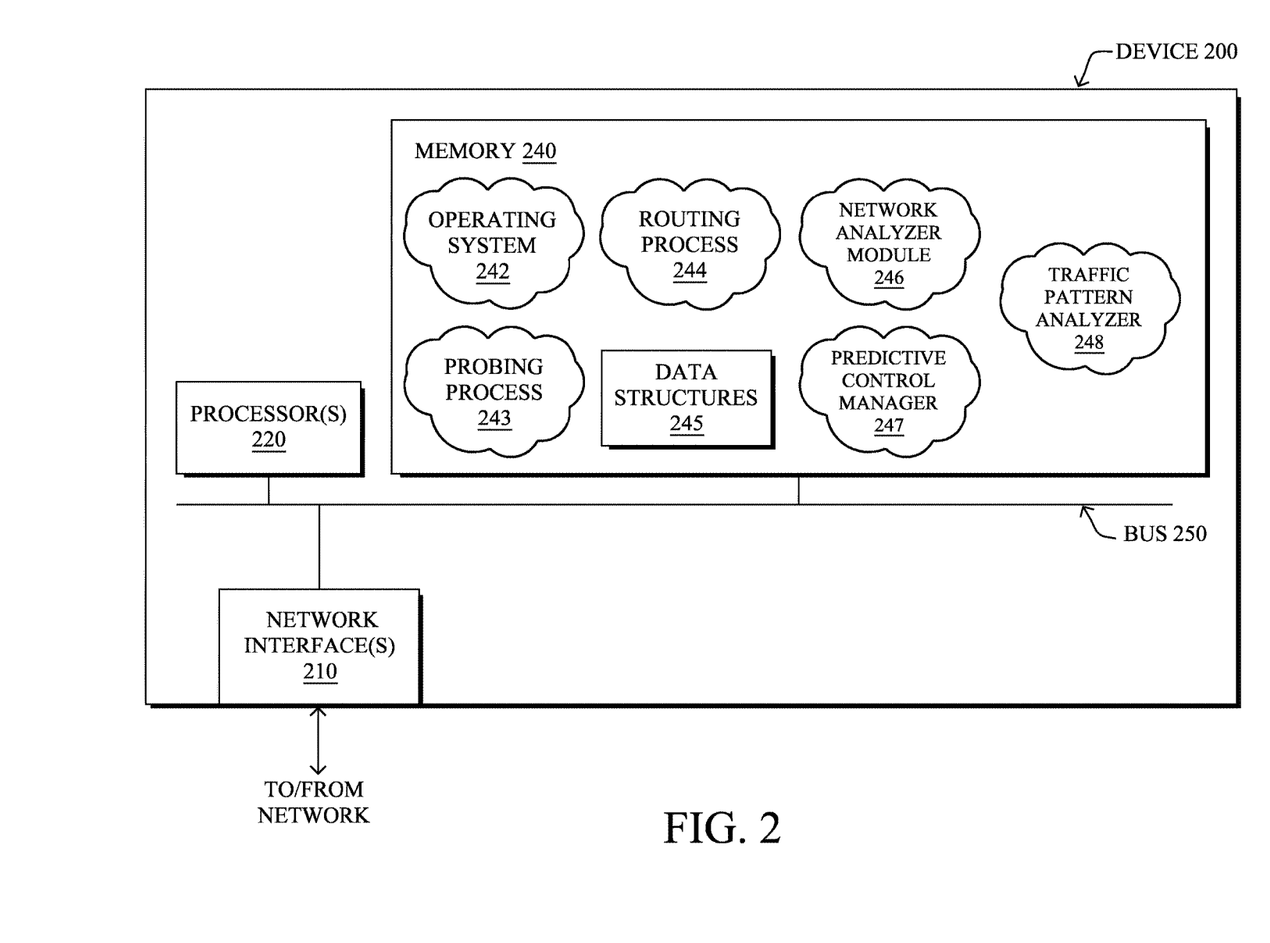
FIG. 2 illustrates an example network device/node.

FIG. 2 is a schematic block diagram of an example node/device 200 that may be used with one or more embodiments described herein, e.g., as any of the routers as shown in FIG. 1, particularly the PEs 120, CE routers 110, a network controller (e.g., a device associated with a network operations center (NOC)), or any other computing device that supports the operations of network 100 (e.g., switches, etc.). The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a network analyzer module (NAM) 246, a predictive control manager (PCM) 247, a traffic pattern analyzer (TPA) 248, and/or a probing process 243, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processors, it is expressly contemplated that various processors may be embodied as modules configured to operate in accordance with the techniques herein (e.g., according to the functionality of a similar process). Further, while processors may be shown and/or described separately, those skilled in the art will appreciate that processors may be routines or modules within other processors.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

In some implementations, routing services 244 may include a distributed application policy infrastructure controller (dAPIC) that operates to enforce application-specific policies on the local device. For example, the dAPIC may receive application-specific SLAs from a network controller via application programming interface (API) calls. Such information may be used, in some cases, to make routing decisions based on the type and priority of an application, as well as the performance of the various network links available to the device. In other words, the dAPIC in routing services 244 may be part of an application centric infrastructure (ACI) that operates to centralize network automation and facilitate the use of policy-driven application profiles throughout the network.

As noted above, traffic and network characteristics may be highly dynamic, making WAN optimization challenging. In addition, the variety of access links that may be involved (e.g., cable, A/V/DSL, links over private or public networks, etc.), potentially with guaranteed SLAs or semi-guaranteed SLAs, further complicates the task of network optimization. In some cases, customer sites may also be connected to backup links (e.g., 3G/4G/LTE wireless links) that provide highly varying performance in terms of connectivity and bandwidth.

Figure 3:
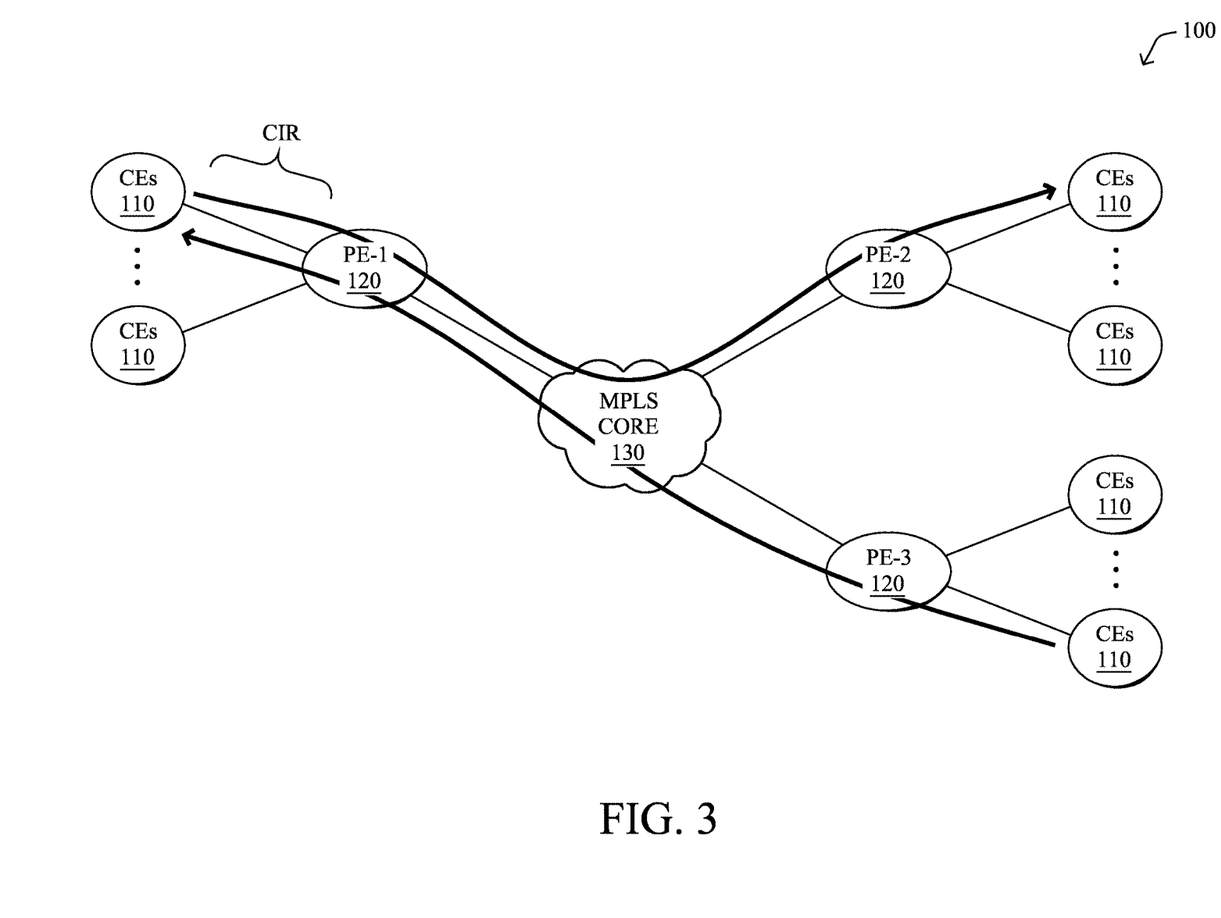
FIG. 3 illustrates an example view of traffic flowing within the communication network of FIG. 1.

Numerous types of application traffic may be flowing through current day networks. For example, as shown in FIG. 3, a particular CE 110 located at a customer site may provide and receive different forms of application traffic that is communicated through network 100. For example, traffic associated with a given customer site may include, but is not limited to, video data (e.g., video conferencing data), audio data (e.g., voice-over-IP (VoIP)), enterprise resource planning (ERP) data, customer relationship management (CRM) data, and the like. Each form of traffic may have specific network requirements and may be very demanding with respect to network availability and resiliency, such that even small deviations in network conditions may render an application incapable of providing the requisite experience to the end user. For example, low network performance may result in a video conference appearing choppy to the end users.

Traditionally, reactive techniques have been used to enforce network performance criteria, such as SLAs. First, the network itself is engineered by defining the application SLAs, quality of service (QoS) parameters, security settings, etc. Next, the performance criteria are monitored in view of the network's performance. If the performance criteria are not met, adjustments may then be made to the network in a reactive manner. Many networking mechanisms exist today to provide on-the-fly guaranteed network performance, such as call admission control, resource reservation, queuing, traffic shaping, etc. However, these tools require careful engineering to perform highly complex tasks in terms of traffic classification, QoS, routing, network and application SLA monitoring, etc. in view of the highly dynamic nature of the traffic and the network. All combined, these techniques make the configuration of a network extremely complicated, while still relying on the fundamental paradigm of reactive networking.

Reactive networking has been the traditional network-engineering paradigm for the past three decades: indeed, policies and rules-based actions are first to determine the required Service Level Agreement (SLA) and the traffic is then classified (colored) using the differentiated services code point (DSCP) field either by the application itself or input routers such as due to Deep Packet Inspection. Routing engineering is a true manual operation. Tunnels are set using various automated mechanisms to ensure security, and traffic monitoring is then performed in order to verify that the required SLAs are indeed met. As pointed out above, new performance-based routing approaches have been designed, but are fundamentally reactive: once the traffic is routed over a specific (pre-determined path), alarms are dynamically generated by the remote end upon SLA violation that may trigger the rerouting of the traffic.

A different approach to reactive routing, however, consists in relying on the concept of predictive networking whereby network analytics is used in order to predict traffic patterns and networks characteristics using machine-learning algorithms. Such an approach is a fundamental paradigm shift contrasting with existing approaches and allowing for non a priori rules-based, manual configuration, significantly more optimal network decisions (for QoS, routing, etc.), predictive performance and thus a significant reduction of risk of violating application SLAs and a significant improvement in terms of "ease of use" for the end user, as well as shorter networking tuning cycles when new applications are enabled in the network.

In particular, according to various embodiments herein, a predictive performance methodology for WANs and other forms of networks is introduced that that allows for its use across varying network architectures, application requirements, and deployment strategies, as well as in the presence of dynamic traffic and network performance. As detailed below, such an architecture may make use of machine learning techniques, in some embodiments, to evaluate future network requirements and performance, and to take corrective measures within the network to ensure the SLAs are met.

According to various embodiments described herein, a dynamic, predictive performance architecture is disclosed that may be implemented in a network, such as a multi-service, multi-carrier WAN. In particular, NAM 246, PCM 247, and/or TPA 248 may operate in conjunction to perform predictive networking, in contrast with existing approaches that rely on reactive networking techniques. In some aspects, TPA 248 may be responsible for tracking all possible attributes of the traffic that is flowing through a router or other device, in order to make predictions regarding the traffic. For example, these attributes may be used to characterize traffic flows over the course of time and to generate profiles that can be used for prediction. In another aspect, NAM 246 may be used to generate an analytical model of the attributes of the network (potentially as a function of time), in order to predict network performance. In a further aspect, PCM 247 may gather application-specific SLAs (e.g., from the ACI controller/dAPIC of routing services 244) and correlate the application-specific SLAs with the predicted traffic profile and network performance, to perform closed-loop control that meets the application-specific SLAs. In various implementations, processors 244 and 246-248 may be co-located or may be distributed across different network devices. Further, while certain functions are described herein with respect to a particular one of processors 244, 246-248, the functions may be incorporated into any of the other processors, in various other embodiments.

Figure 4A:
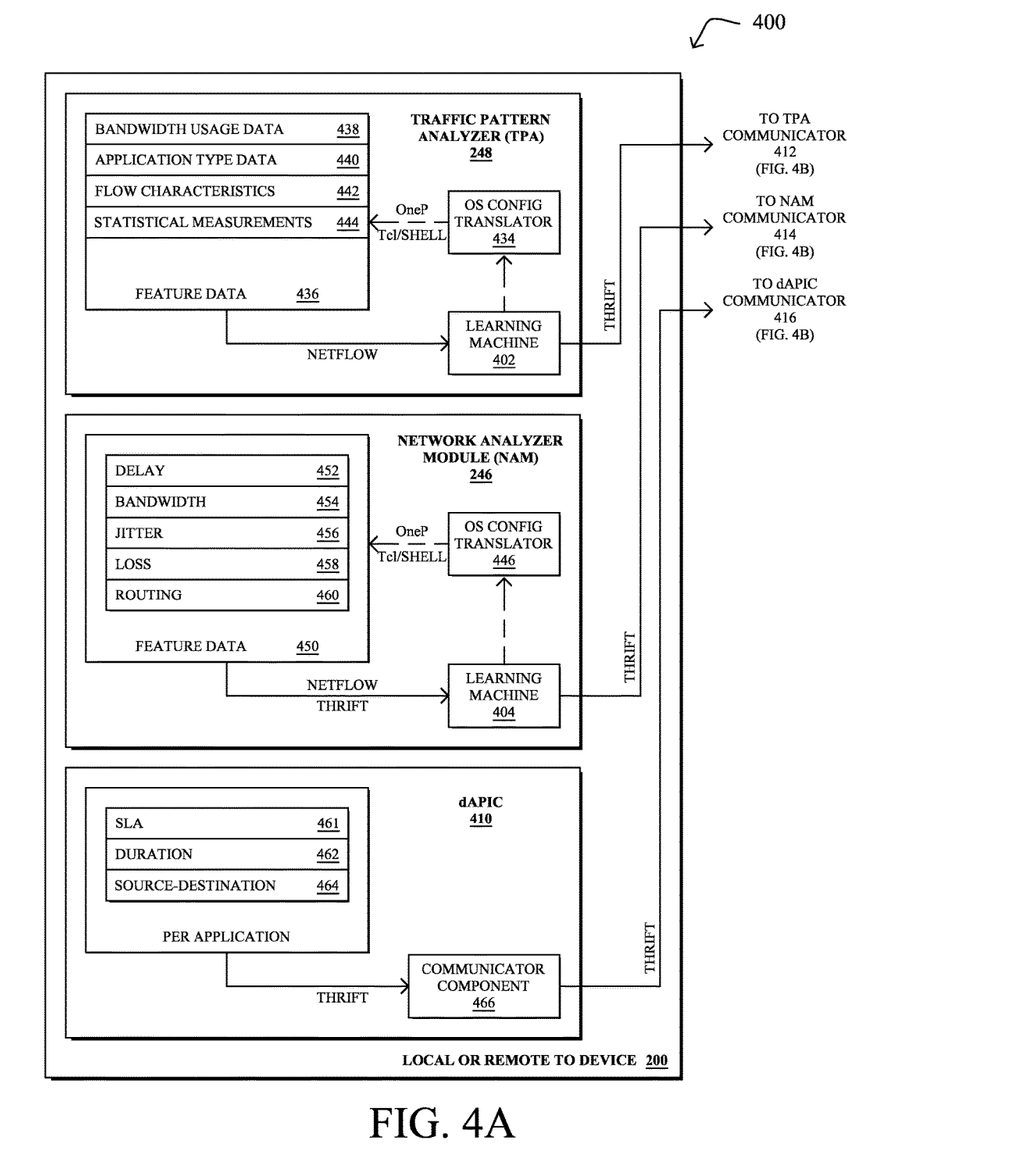
FIGS. 4A-4B illustrate an example architecture for predictive networking.
Figure 4B:
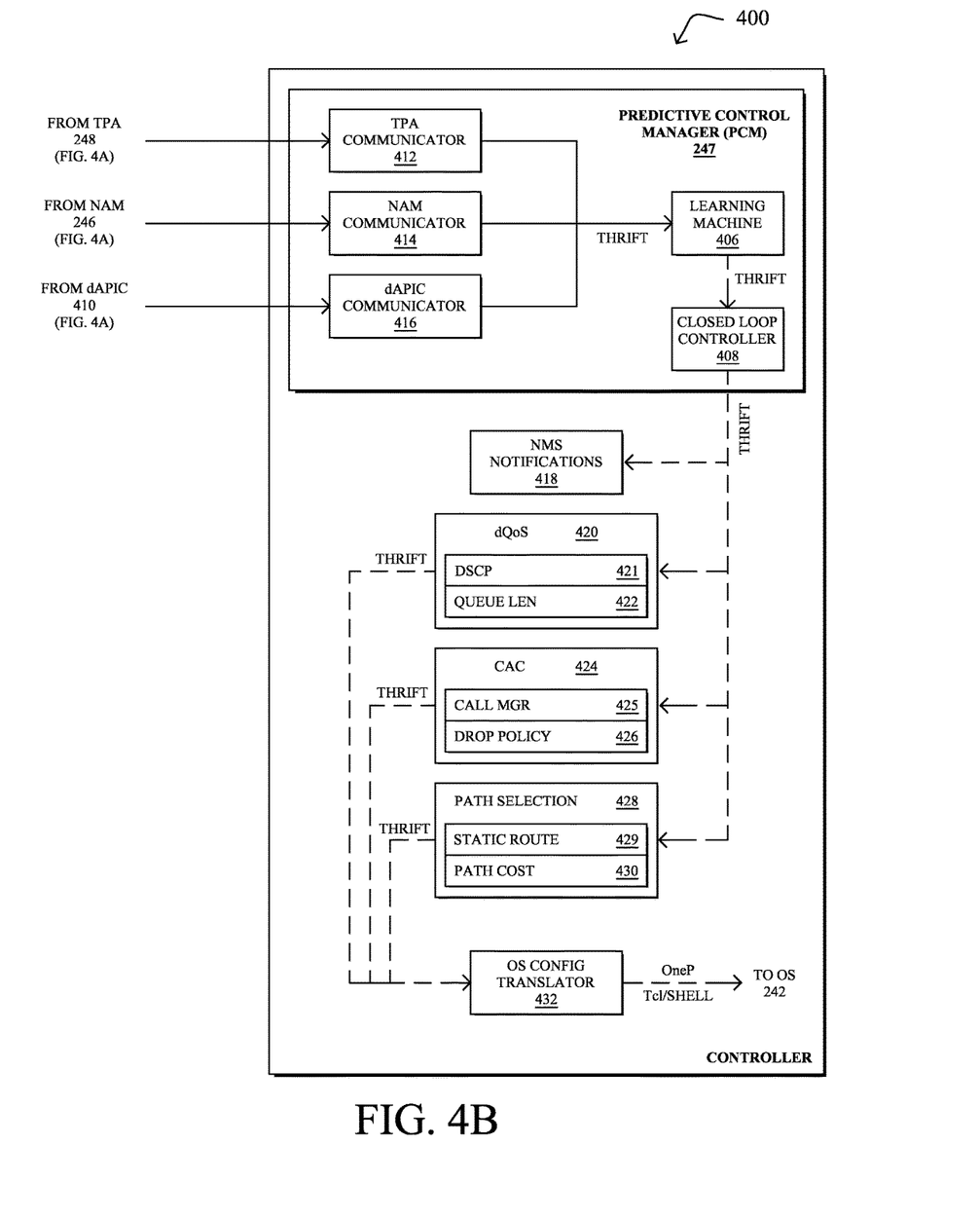

Referring now to FIGS. 4A and 4B, an example architecture 400 for predictive networking is shown in greater detail, according to various embodiments. As shown in FIG. 4A, TPA 248, NAM 246, and/or a dAPIC 410 may be local or remote to a given device 200. In FIG. 4B, PCM 247 may be hosted on a different device, such as a network controller, or may be integrated into the same device as that illustrated in FIG. 4A, in various embodiments.

Underlying the functionality of NAM 246, PCM 247, and/or TPA 248 may be learning machines 404, 406, and 402, respectively. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning machines (e.g., learning machines 402-406) are computational entities that rely on one or more machine learning processors for performing a task for which they have not been explicitly programmed to perform. In particular, learning machines are capable of adjusting their behavior to their environment. For example, a learning machine may dynamically make future predictions based on current or prior network measurements, may make control decisions based on the effects of prior control commands, etc.

Learning machines 402-406 may employ any number of different machine learning techniques. For example, artificial neural networks (ANNs) are a type of machine learning technique whose underlying mathematical models were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Other forms of machine learning techniques that may be employed by learning machines 402-406 may include, but are not limited to, support vector machines (SVMs), Bayesian networks, regression techniques (e.g., logistic regression, linear regression, non-linear regression, etc.), combinations thereof, or any other form of machine learning.

In various embodiments, TPA 248 may reside within a router or on a host computing device, and may have connectivity to one or multiple routers in the network. In general, TPA 248 may be operable to analyze every facet of the traffic flowing through the router. For example, TPA 248 may receive traffic-related data from the operating system of the device via an OS configuration translator 434, such as from an application visibility and control (AVC) process that is configured to classify traffic data according to application type (e.g., Cisco AVC® of Cisco Systems, Inc.), a network traffic flow process (e.g., Cisco IOS Flexible Netflow® of Cisco Systems, Inc.), a media metrics process (e.g., a process that generates metrics regarding video streams), etc. These or other such reporting technologies may be used by TPA 248 to compute a set of input feature data 436 (e.g., attributes that capture the characteristics of the traffic), that may be used by learning machine 402 to predict a traffic profile.

Feature data 436 may include any or all of the following information:

1.) Bandwidth Usage Data 438: In some cases, feature data 436 may include data regarding the bandwidth usage of a particular type of traffic (e.g., application-specific bandwidth usage information). This information may provide a profile of the traffic over the course of time to learning machine 402.

2.) Application Type Data 440: Feature data 436 may include data regarding the various application types associated with the traffic (e.g., VoIP, video, etc.). In various embodiments, application types may be determined based on the port numbers used, via an application recognition utility (e.g., Network Based Application Recognition® of Cisco Systems, Inc.), or the like.

3.) Flow Characteristics 442: In some cases, feature data 436 may include traffic flow information such as the duration of a flow, the rate of new flows, metrics capturing the rate of change of the previous metrics over time, or other such information. These flow characteristics may be captured from underlying infrastructures such as an application recognition utility, a call manager, or the like.

4.) Statistical Measurements 444: In some embodiments, feature data 436 may include statistical measurements regarding the flow of traffic. For example, measurements 444 may include data regarding the moments (e.g., variance, skewness, kurtosis, etc.) of the traffic distribution, both in terms of packets/sec and bytes/sec, on a per flow basis, or on a per time path basis. In another example, measurements 444 may include other statistical properties of the traffic flow, such as autocorrelation, Fourier series coefficients, etc.

Together, feature data 436 can be used by learning machine 402 to determine characteristics of the underlying traffic flow and how it changes with time. Once learning machine 402 starts to develop a time series model using these attributes, for example, it may decide that it needs more information about some of these features or, conversely, that some of these features are not relevant. In such cases, the update rate of the features may be adjusted accordingly by TPA 248 (e.g., to reduce the update rate of irrelevant data, etc.). In one embodiment, adjusting the refresh rate of feature data 436 may be policy-based to reduce traffic overhead in the network. For example, certain features may be collected or refreshed at different rates depending on the time of day, to reduce adverse effects on the network from the collection.

In some implementations, TPA 248 may require some processing capabilities that are not available on the router carrying the actual traffic itself. In such cases, TPA 248 may be hosted on a different router/host, which may be co-located either on a router blade (e.g., a UCS blade), or a different router/host connected to the router via a high bandwidth link.

According to various embodiments, NAM 246 may reside on the router processing the traffic under analysis itself or on a host that has network connectivity to the concerned routers. In general, NAM 246 may be operable to track all the network conditions that are visible to the corresponding router, in order to model the network performance characteristics. In contrast with reactive approaches, NAM 246 may be used to compute a model of the network performance using learning machine 404. For example, NAM 246 may determine the performance of each link/path available to connect a remote/branch office to a corporate network or headquarters.

Similar to TPA 248, NAM 246 may gather feature data 450 that is used as inputs to learning machine 404 (e.g., via OS configuration translator 446). For example, feature data 450 may be determined in part by sending probes between a given sender and a given responder, to capture metrics regarding the performance along the path. Other sources of feature data 450 may also include any or all of the sources used to determine feature data 436. In various embodiments, feature data 450 may include any or all of the following information:

1.) Delay Information 452: In some cases, feature data 450 includes delay measurements along a given network path and/or link.

2.) Bandwidth Information 454: Feature data 450 may also include bandwidth information associated with a given network path and/or link. For example, bandwidth information 454 may include data regarding the total bandwidth usage of the path or link, the per-application bandwidth usage of the path or link, available bandwidth along the path or link, etc.

3.) Jitter Information 456: Feature data 450 may further include jitter information associated with a given path and/or link. For example, the total amount or application-specific jitter measurements along a path or link may be included in feature data 450.

4.) Packet Loss Information 458: In some cases, feature data 450 may include packet loss information, such as a measured packet loss rate along a given path and/or link.

5.) Routing Information 460: Associated with any of data 452-458 may be information regarding a given network path (e.g., the link or set of links for which the measurements of data 452-458 were determined).

Learning machine 404 may continually track feature data 450 (e.g., as a time series model), to characterize these attributes. In other words, learning machine 404 may use a predictive model to predict future network performance metrics based on feature data 450. In some implementations, NAM 246 may also adjust the collection of feature data 450. For example, NAM 246 may configure one or more corresponding routers to generate more or less features based on the requirements of learning machine 404 (e.g., the amount of probing used may be adjusted as a function of the model's accuracy and confidence, based on network considerations such as current or future network usage, etc.).

In some embodiments, learning machine 404 may use the principle of data fusion to model the network performance metrics. This principle generally functions by integrating multiple data sources and knowledge about a real-world process (in this case, the underlying network), into an accurate representation of the functioning of the network. For example, bandwidth data 454 along a given path may be available from any of the following source: (1) SLA processors may yield data about the delay, jitter and packet loss, which can, in some circumstance, be used to estimate the available bandwidth via a regression model, such as variational Bayesian least squares (VBLS) regression model, (2) actual bandwidth measurements can be taken occasionally, but with care as they affect the network performance, or (3) time-series models such as autoregressive moving average (ARMA) models, Hidden Markov Models, Gaussian Processors can be used to predict the performance evolution.

Feature data 450 available from various sources of information can be fused by NAM 246 in real time in a mathematically principled way by using a Kalman filter or graphical models, whereby the intrinsic uncertainty of each source of information is accounted for in the estimation of the data (e.g., available bandwidth, etc.). For example, if one makes a direct measurement of the actual bandwidth at time t, the uncertainty on this measure is very small, and it should therefore have a very strong impact on the estimation process at time t. However, as t increases, the uncertainty also increases as the actual bandwidth may drift away from the initial measurement. This drift may then be captured via a time-series model, and complemented by indirect measurements (e.g., based on delay, jitter, etc. measurements). As long as both sources agree, there is no reason to perform any further direct measurement, which may be very expensive, but if the prediction of the time-series model and the regression diverges, this may trigger another direct measurement. In some embodiments, NAM 246 may determine whether a direct measurement of any of feature data 450 is needed based on a measure of confidence associated with a model used by learning machine 404.

In some implementations, dAPIC 410 may store and provide various application-specific data via a communicator component 466. In general, dAPIC 410 may be operable to ensure that all the application SLAs are being met at all times in the network and, consequently, perform various actions without human intervention, to dynamically adapt the network behavior as needed. Accordingly, dAPIC 410 may have access to various application-specific SLA information such as SLA data 461 (e.g., a set of SLAs), duration data 462 regarding the SLAs (e.g., when a particular SLA is to be enforced), and/or source-destination data 464 regarding the network paths used by the various applications.

In various embodiments, TPA 248, NAM 246, and dAPIC 410 may provide data to PCM 247 shown in FIG. 4B, which may be co-located with these modules or may be hosted on another device (e.g., in a network controller, in the cloud, etc.). Accordingly, PCM 247 may include communicator modules 412, 414, and 416 to communicate with TPA 248, NAM 246, and dAPIC 410, respectively. In one embodiment, PCM 247 receives traffic model data generated by learning machine 402 from TPA 248 via communicator module 412. In a further embodiment, PCM 247 receives network performance model data generated by learning machine 404 from NAM 246 via communicator module 414. In yet another embodiment, PCM 247 may receive application-specific SLA data from dAPIC 410 (e.g., data 461-464), which may have information about all of the applications in the network, as well as their corresponding SLA requirements.

If an application SLA is predicted not to be met, PCM 247 may take any number of corrective measures to ensure that the SLAs continue to be met (e.g., by sending commands to OS 242 via an OS translator module 432). In some implementations, the corrective measures may be performed via a closed loop controller 408, thereby allowing feedback (e.g., updated predictions from TPA 248 and NAM 246) to be used by PCM 247 when taking corrective measures. In one embodiment, PCM 247 may generate and send a notification 418 to a network management system (NMS), allowing a human operator to intervene, if necessary, at the appropriate place and time in the network.

In another embodiment, PCM 247 may dynamically generate new QoS parameters 420 such that application-specific SLAs continue to be met. Example QoS parameters may include differentiated services code point (DSCP) parameters 421, queue length parameters 422, further parameters that change bandwidth percentage allocations to different classes, parameters that change the class of service for applications, etc.

In a further embodiment, PCM 247 may change call-admission control (CAC) policies 424 used as part of a communications management system. For example, CAC policies 424 may include parameters 425 for a call manager system (e.g., a system that tracks and manages active VoIP network components), drop policy parameters 426, or the like. Such parameters may be used, in some cases, to prevent admission of new traffic flows if the available bandwidth is already fully used.

In another embodiment, PCM 247 may generate path selection parameters 428. In general, path selection parameters 428 may operate to ensure that, based on a particular application type, the corresponding traffic is routed over different paths such that all applications continue to meet their SLAs. For example, path selection parameters 428 may include one or more static routes 429 to be used by a particular type of application traffic, path cost values 430 used to make routing decisions, or any other data that may be used to adjust which paths are used in the network by a particular type of application traffic. For example, traffic of class X may suddenly have to be routed over a 3G/4G link (although more costly) for a period of time T in order to meet the required SLA received from dAPIC 410 (e.g., application-specific SLAs 461), according to the predicted traffic from the TPA 248 and expected network characteristics from NAM 247.

Notably, such a predictive architecture 400 supports different modes of operation. In some cases, the system may request human intervention as part of the control loop. In other words, PCM 247 may operate as a distributed recommendation system for network parameter changes that should be adjusted in order to meet the SLAs (e.g., by sending NMS notifications 418 for review by a network engineer). In other cases, the system may be fully autonomous by employing closed loop control to make decisions on a router in real-time and report on the decisions to a human operator afterwards. As will be appreciated, the various modules described in architecture 400 may also communicate using remote procedure calls (RPCs) (e.g., using the Apache Thrift® protocol from the Apache Software Foundation or another RPC protocol), allowing the depicted modules to be co-hosted by a device or located remotely on different devices. Communications with the operating system of the device may also be performed using any suitable technique, such as by sending scripts through a Tcl/Shell.

As described above, both predictive and reactive routing solutions rely on measured performance metrics to make routing decisions. Determining the state of the various network attributes such as delay, jitter, packet loss, and available bandwidth accurately is often desired as it allows the operator to provide optimum services to its applications. A challenge with this approach is that probes involve both traffic and processing overhead at the affected network elements, thereby also affecting the SLAs offered to the traffic already flowing through the network. This challenge is further exacerbated when multiple classes of traffic are involved, typically with multiple source-destination pairs each having their own requirements to be met. Currently, existing probing technologies are highly static and repetitive in their operation, which not only is highly intrusive but often fails to capture application specific conditions and variability when needed. In addition, traditional probing mechanisms are not application-aware, thus rendering them ineffective to the continuous addition of new applications with varied requirements taking place in modern day networks.

Application-Centric Network Measurement

The techniques herein present an infrastructure for generating dynamically crafted network measurement packets/probes that take into account the variability and seasonality of network characteristics, are aware of the degree of intrusion that they are causing, and are able to capture the network state in an application-centric fashion. In contrast to current day probing methodologies where configurations are static and probing tends to be intrusive when network events arise, the techniques herein allow for the deployment of application-centric and application-aware probing. In a first aspect, a traffic sensing process is disclosed that is application-aware and continually tracks the various applications flowing through the network, thereby reducing and preventing intrusion to these applications during probing. The traffic sensing process is also application-centric as the probes can be dynamically configured to mimic application behavior and thus generate measurements corresponding to the applications in flux. In another aspect, a probe crafting process is introduced that is operable to dynamically craft probe packets according to the demands of the network state, including dominant applications traversing the network and their SLA requirements. In a further aspect, a probe timing process is introduced that is responsible for generating the timing sequences associated with each probe, encompassing transmission schedules and inter-departure time intervals. In another aspect, a probe routing process is introduced that is operable to select the probe destinations (e.g., based on a statistical analysis of the criticality and volume of the traffic on a global and on a per-destination basis). In yet a further aspect, a probe measurement and analysis process is introduced that is operable to provide closed-loop control over the probing mechanism. In particular, the probe measurement and analysis process may use information gained from the probing to dynamically change the configuration parameters of the probes using the above components for the next iteration of probing. To support the probe measurement and analysis process, a network element state tracking process is introduced that is operable to ensure that the probing does not intrude upon the application traffic. A measurement reinforcement feedback process is also introduced herein that allows configuration decisions by the probe measurement analysis process to be reinforced (e.g., based on a tradeoff between the usefulness of the probing strategy used and the effects of the probing strategy on the network).

Illustratively, the techniques described herein may be performed by hardware, software, and/or firmware, such as in accordance with the probing process 243, which may include computer executable instructions executed by the processor 220 to perform functions relating to the techniques described herein. For example, the techniques herein may be treated as extensions to machine learning processes and protocols, and as such, may be processed by similar components understood in the art that execute those processes and protocols, accordingly.

Specifically, according to various embodiments, a device in a network receives data indicative of traffic characteristics of traffic associated with a particular application. The device identifies one or more paths in the network via which the traffic associated with the particular application sent, based on the traffic characteristics. The device determines a probing schedule based on the traffic characteristics. The probing schedule simulates the traffic associated with the particular application. The device sends probes along the one or more identified paths according to the determined probing schedule.

Operationally, the techniques herein introduce an infrastructure comprising a number of processes that provide an application-centric approach to network measurement. In particular, a traffic sensing process may collect statistical properties of the packet flows for each application, and provide these properties to probe crafting, probe timing, and probe routing processes, to generate and send probes into the network. A probe measurement and analysis process may coordinate the operation of the various processes and determine which probe should be sent, to optimize the tradeoff between invasiveness and accuracy of the probes. In various embodiments, the network performance characteristics obtained via probing may be provided to one or more learning machines (e.g., learning machines 402-406), as part of a predictive routing mechanism. For example, in a next-generation, intelligent WAN (IWAN), a traffic shaping learning machine process may constantly adjust its strategy based on the predictions of a learning machine that estimates the available bandwidth in the network based on historical measurements provided by the probing infrastructure described herein.

Figure 5:
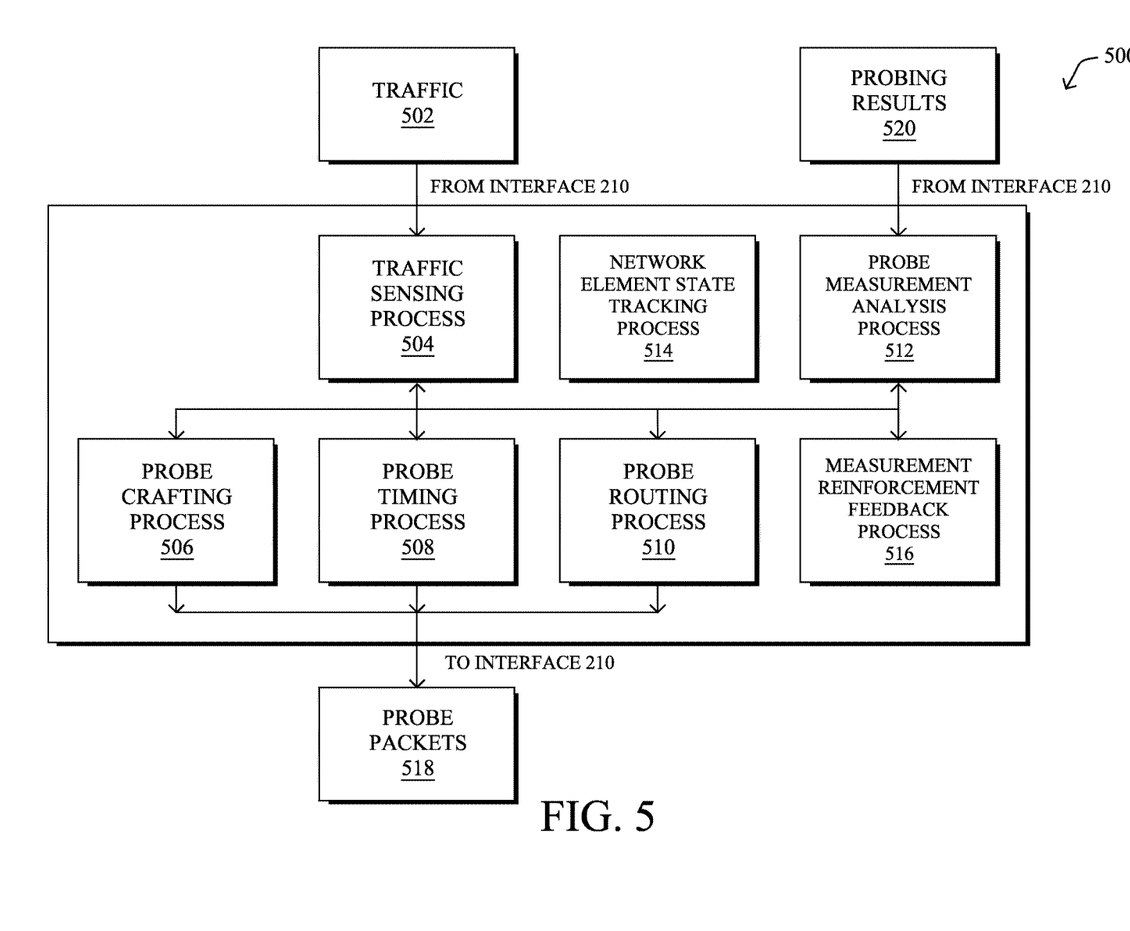
FIG. 5 illustrates an example probing process.

Referring now to FIG. 5, an example of probing process 243 is shown, according to various embodiments. As shown, probing process 243 may include a number of (sub)processes 504-516. In various embodiments, probing process 243 may be executed by a single device. However, in other embodiments, probing process 243 may be implemented in a distributed manner (e.g., processes 504-516 may be individually executed by any number of different devices in the network).

Probing process 243 may include a traffic sensing process 504, in one embodiment. In general, traffic sensing process 504 may be similar in operation to that of traffic profile analyzer (TPA) 248 described above, in that traffic sensing process 504 may be operable to generate and analyze the profiles of the network traffic. However, while TPA 248 may generically analyze the network traffic in the aggregate, traffic sensing process 504 may be more fine-grained and analyze application-specific traffic profiles. In addition, while TPA 248 may include a learning machine 402 that predicts future traffic conditions, traffic sensing process 504 may be more limited and may not compute a predictive model of the traffic, in some embodiments.

The primary function of traffic sensing process 504 is to determine the application-specific attributes and characteristics of the different traffic flows in the network and provide this information to the processes responsible for conducting the probing (e.g., processes 506-510). For example, traffic sensing process 504 may analyze traffic 502 to determine packet size information (e.g., the minimum packet size, maximum packet size, average packet size, etc.) of packets associated with a particular application, DSCP information of the packets, flow durations on an application-specific basis, intervals between multiple flows, packet intervals in each flow, etc. As can be seen, the number of attributes to characterize multiple applications can be quite large and it is the responsibility of traffic sensing process 504 to capture these data. To do so, in various embodiments, traffic sensing process 504 may observe traffic 502 within the network and using deep packet inspection, port number combinations, a network based application recognition mechanism (NBAR), or other inspection techniques, to obtain information regarding the characteristics of traffic 502.

In addition to determining the characteristics of traffic 502, traffic sensing process 504 may also track periods of time when non-delay-sensitive and adaptive traffic is flowing through the network. These periods are particularly useful for generating large measurement traffic flows without disrupting user traffic. All the above information may be gathered periodically by traffic sensing process 504 and relayed to any of processes 506-510. This may be done either through a newly defined IPv6 message, if these components are not collocated, or through IPC mechanisms, if they are. The rate at which traffic sensing process 504 samples traffic 502 may also be configurable based on, e.g., requirements such as sensitivity, processing overhead, etc.

Probing process 243 may include a probe crafting process 506 that is operable to generate probe packets 518 for use during probing. For example, probe crafting process may allow the size of probe packets 518, the source and destination ports for probe packets 518, the type of service (TOS)/DSCP of probe packets 518, the payload of probe packets 518, etc., to be configured dynamically. In particular, probe crafting process 506 may be operable to keep the probe packet attributes dynamically configurable so that their creation can be governed by a combination of application requirements, current network state and/or network attribute to be measured.

In response to receiving application-specific information from traffic sensing process 504, probe crafting process 506 may generate probe packets 518 that capture the same packet characteristics as the application, according to various embodiments. Said differently, probe crafting process 506 may generate probe packets 518, to simulate the application-specific traffic. This may allow measurements to be made of the network that closely capture the similar conditions that the application will face in the network. For example, traffic with different TOS/DSCPs are typically treated differently in provider networks. Traditionally, however, this information is not available to network elements, as applications never communicate the state of their health to the network.

Once probe packets 518 are crafted by probe crafting process 506, packets 518 can be sent out at any point in time, thereby giving more insight into the QoS an application will experience at different times of the day. In one embodiment, application attributes may be obtained from an offline entity rather than traffic sensing process 504, even before the application has been rolled out into the network (e.g., according to a specific "what if" scenario). This too, will give a lot of insight into the expected QoS new applications will face.

In some embodiments, aside from the interaction with traffic sensing process 504, probe crafting process 506 may also be operable to generate probes that are configured arbitrarily and do not simulate the traffic of any particular application. Such probes may be lightweight or heavyweight in size based on the state of the network and may be generated to periodically sample network attributes such as delay and jitter in an application-agnostic way. In these cases, the application attributes along with specific probing conditions (e.g., the time of the day when the application would be active, activity, burstiness of the traffic, etc.) could be encoded within a custom XML schema or in the form of a set of type-length-values (TLVs) carried out using a custom defined IP unicast or multicast message, should the use require to send probes mimicking the future traffic on different locations of the network.

Probing process 243 may include probe timing process 508, which may be operable to schedule the actual transmission of probe packets 518. Such a schedule may correspond to points in time at which probe packets 518 are scheduled for transmission, the inter-departure times between two of probe packets 518 (e.g., when a train of probe packets are being generated), the duration for which probe packets 518 should be kept transmitting, or the like. When the traffic sensing process 504 shares information regarding application flow durations and other time related statistics with probe timing process 508, probe timing process 508 may use this information to model the timing of the corresponding probes (e.g., probe packets 518).

Similar to probe crafting process 506, probe timing process 508 may also be operable to send out generic, application-agnostic probes using various combinations of either solitary probes or short/long trains of probes to sense different aspects of the network, in some embodiments. In addition to sensing network characteristics, sometimes path saturation may be required (e.g., to determine available bandwidth, etc.). In this situation, packet timing process 508 may schedule enough packets to be sent out at a particular rate so as to saturate a particular path. Such a saturation condition may be determined by probing process 243 by observing packet loss. In another embodiment, saturation and sensing can take place at the same time where once instance is trying to bombard the path with probes whereas another instance is sending single probes to sense the delay, jitter and/or packet loss. In another embodiment, probe timing process 508 may schedule the emission of application-centric probes only when the application-agnostic probes suffer delays, jitter or loss more than preconfigured thresholds.

Probing process 243 may include a probe routing process 510 that is responsible for directing probing packets 518 on specific paths and towards specific destinations. A typical branch sends traffic to multiple destinations, which could include other branches or datacenters. This traffic, however, also typically varies greatly from destination to destination in terms of the type, class, volume, variability and seasonality. Once traffic sensing process 504 has determined the various characteristics of traffic 502 egressing the network, probe routing process 510 may use this information to determine which destinations should have more probes sent to them, as they are also responsible for the larger or more critical types of traffic.

Accordingly, probe crafting process 506, probe timing process 508, and probe routing process 510 may work in conjunction to cause probe packets 518 to be sent. Notably, based on the characteristics of traffic 502 determined by traffic sensing process 504, processes 506-510 may work in conjunction to control, how, when, and where probe packets 518 are sent in the network.

In various embodiments, probing process 243 includes a probe measurement analysis process 512. In general, probe measurement analysis process 512 may be responsible for controlling the operations of any of the other (sub)processes 506-510 of probing process 243. In other words, probe measurement analysis process 512 may operate as a control system that takes as input probe results 520 from the previous iteration of probing and, in response, output control commands to processes 506-510. In particular, probe measurement analysis process 512 may coordinate the crafting, emission and routing of probe packets 518, to track one or more network properties (e.g., the available bandwidth along a given path, etc.) while minimizing the invasiveness of the probing process. For instance, if a particular TOS value of probe packets 518 always yields high delays, probe measurement analysis process 512 may instruct probe crafting process 506 to increase the TOS and observe the effects when the corresponding probing packets 518 traverse the network.

In another embodiment, when probing packets 518 are being generated to saturate a link and cause loss (e.g., to determine available bandwidth limits), probe measurement analysis process 512 may use periodic feedback from probe results 520 that indicate the presence or absence of packet loss. Probe measurement analysis process 512 may use this feedback to determine whether the transmission rate of probe packets 518 should be increased or decreased. This can be done by constantly tracking the limit data rate at which loss starts to appear via a sequential probabilistic model such as a Kalman filter. Generally speaking, a Kalman filter may model the limit data rate using a Gaussian distribution that is updated at each time step of the probing process. Whenever the uncertainty on the estimate of this limit data rate is too high, probe measurement analysis process 512 may adjust probe timing process 508 to schedule a probe, thereby providing a new measurement to the Kalman filter, and reducing the uncertainty to an acceptable level.

Probing process 243 may include a network element state tracking process 514 that is configured to monitor local states (e.g., queues, interface counters, processing overhead, available memory, etc.), when the generation of probe packets 518 takes place. This may be done to observe the effect of probing on the network and used as a feed-back mechanism to probe measurement analysis process 512. In turn, probe measurement analysis process 512 may use the information regarding the effects of probing packets 518 on the network, to determine whether the probing strategy is too intrusive to legitimate application traffic in the network. For example, if queues start to form once probing starts, this is a sign that applications will start to see a drop in their SLAs. In another situation, if the CPU utilization increases during packet crafting, it may be a sign that the CPU will be slower to process incoming application packets. In these situations, probe measurement analysis process 512 may decide to either stop sending probe packets 518 completely or, alternatively, reduce the rate at which they are being created or transmitted. Similar actions may be taken by probe measurement analysis process 512 if a drastic increase in packet drops or jitter on user traffic is observed (e.g., as indicated by probe results 520). In some embodiments, network element state tracking process 514 may also be used to support the operations of a measurement reinforcement process 516.

Measurement reinforcement feedback process 516 may enable probe measurement analysis process 512 to use reinforcement learning, to optimize its probing strategy on the fly and in real-time. The core idea behind reinforcement learning is to allow a system to learn by trial-and-error, whereby its actions are sanctioned by a feedback from the system (often called a reward). Such systems need to maintain a balance between explorative behavior (e.g., in order to learn whether a given action is beneficial or detrimental to the performance of the system) and exploitative behavior (e.g., in order to maximize the performance of the system).

In the context of probe measurement analysis process 512, measurement reinforcement feedback process 516 may allow the system to generate probe packets 518 of different sizes, at different rates, with different TOS/DSCPs, etc., as a way to explore the space of possible probe configurations/probing strategies. In this case, the "reward" would be a function of the impact of these probes on the network (e.g., measured both directly via the probing and indirectly via traffic sensing process 504) and the amount of information provided by the probes (e.g., information passed to a learning machine and used by the learning machine as input). In one embodiment, a newly defined IPv6 message probe_score( ) may be specified whereby the learning machine using probing results 520 as input may provide probe measurement and analysis process 512 with a score that denotes the usefulness of probing results 520 (or, in more formal terms, the amount of information) provided by a probe. As a result, measurement reinforcement feedback process 516 may cause probe measurement analysis process 512 to learn, by reinforcement, the optimal probing strategy so that the impact on the network is minimal and the information provided to the learning machine is maximal.

Figure 6:
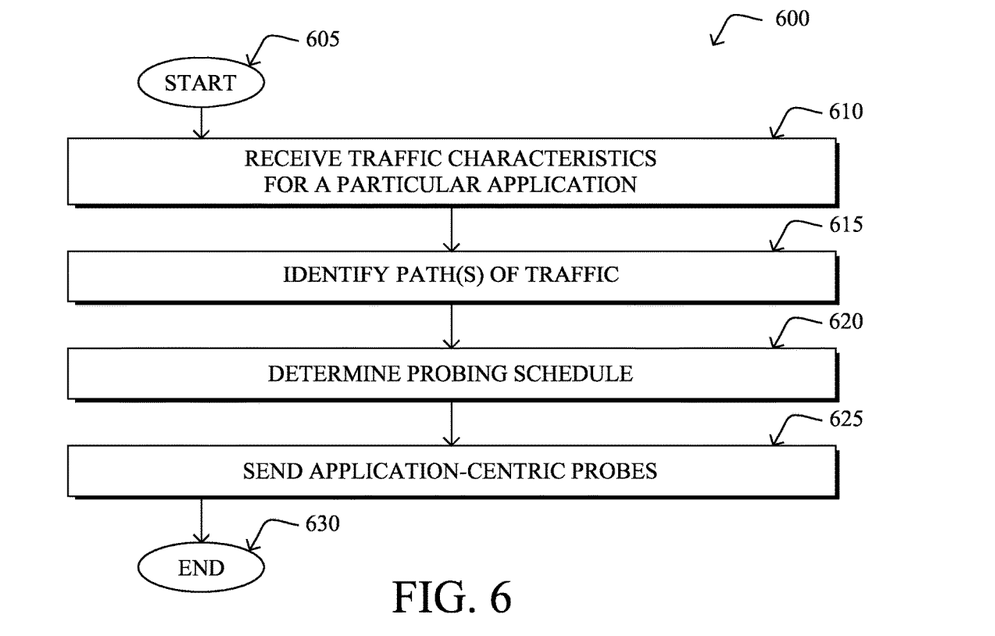
FIG. 6 illustrates an example simplified procedure for sending application-centric probes in a network.

FIG. 6 illustrates an example simplified procedure for sending application-centric probes in a network, in accordance with various embodiments herein. Such a procedure may be used, in one embodiment, to generate probing results that are used as input to one or more learning machines (e.g., as part of a predictive routing mechanism in the network). The procedure 600 may begin at step 605 and continue on to step 610 where, as described in greater detail above, a device in a network may receive data indicative of traffic characteristics of traffic associated with a particular application. Such applications may include, but are not limited to, automation applications, control applications, voice applications, video applications, alert/notification applications, and the like. For example, the received data may indicate the characteristics of traffic associated with a particular video conferencing application. The traffic characteristics may include, but are not limited to, information regarding a packet size (e.g., a minimum size, a maximum size, an average size, etc.), a flow duration, DSCP or TOS information, time intervals between multiple flows, time intervals between packets of the same flow, port information, path information (e.g., sources and/or destinations of the traffic flows), combinations thereof, or the like.

At step 615, as detailed above, the device may identify the path(s) via which the application-specific traffic is sent. In particular, based on the data indicative of the traffic characteristics received in step 610, the device may determine which network paths are used by the application-specific traffic. The device may also determine the proportions of the traffic sent along the different network paths and any other information regarding how the traffic is routed in the network.

At step 620, the device may determine a probing schedule for application-specific probes to be sent in the network, as described in greater detail above. In various embodiments, the probing schedule may be such that schedule of the probe packets simulate the actual packets of the application-specific traffic. Notably, the device may determine when the probing packets should be sent, the intervals between the packets, the intervals between the packets of a given flow, etc. Other characteristics that may be used to simulate the application-specific traffic during probing may include the packet sizes, the packet payloads, the TOS/DSCP information, etc.

At step 625, the device may send application-centric probes in the network, to measure the network's performance relative to the application traffic, as detailed above. In various embodiments, the probes may be configured to simulate, in whole or in part, the actual application traffic within the network. For example, the application-centric probes may be sent via the network path(s) identified in step 615 and according to the probing schedule determined in step 620. Thus, the probes may be used to measure the network performance (e.g., delay, jitter, packet loss, bandwidth, etc.) that may be experienced by the application traffic in the network. As noted previously, typical probing mechanisms are application-agnostic and only seek to quantify the performance of the network paths themselves for all types of traffic. However, the actual performance for a particular application may vary from this general case (e.g., higher priority traffic may experience less delays, etc.). In one embodiment, the device may first attempt to send application-agnostic probes and, in response to determining that the performance is below a certain threshold, begin sending application-centric probes. Procedure 600 then ends at step 630.

Figure 7:
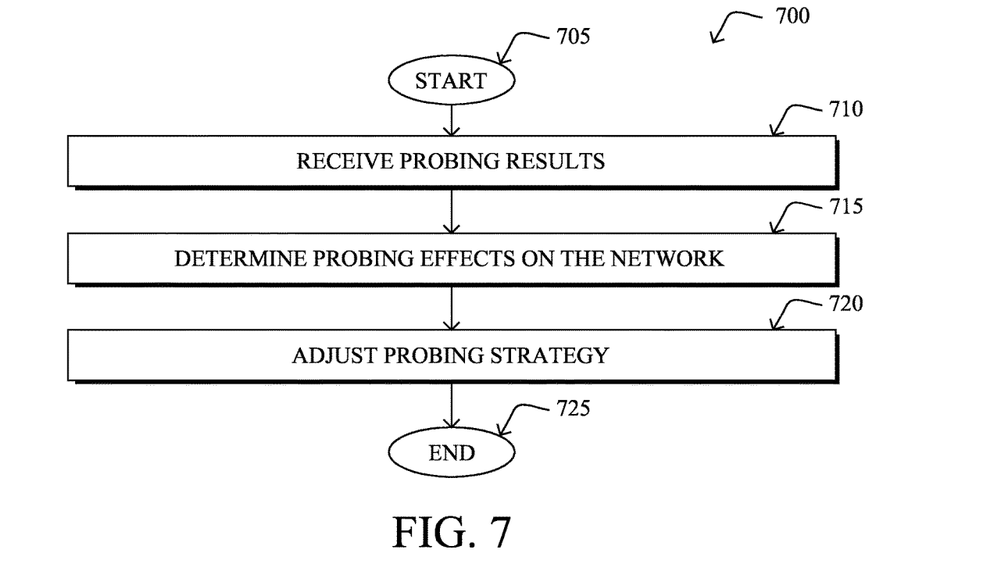
FIG. 7 illustrates an example simplified procedure of a feedback mechanism to adjust an application-centric probing mechanism.

FIG. 7 illustrates an example simplified procedure of a feedback mechanism to adjust an application-centric probing mechanism. The procedure 700 may begin at step 705 and continue on to step 710 where, as described in greater detail above, a device in a network may receive probing results from a probing process. The probing results may generally correspond to any observed effect of probes on the network. For example, the probing results may indicate a measured amount of delay, jitter, bandwidth, packet loss, etc. for application-centric probes sent through the network. In further embodiments, the probing results may indicate the effects of the probing process on the device itself and/or on any of the nodes along the probed path(s). For example, the probing results may indicate the queue states (e.g., whether the queue of a node is saturated, etc.) and/or available resources (e.g., CPU, memory, etc.) of the device/node.

At step 715, the device may determine the effects of the probing on the network, as described in greater detail above. In particular, the device may determine whether its probing strategy (e.g., when, where, and how the probes are sent) should be adjusted. For example, if node queues become saturated within a short time of beginning the probing, or if the available resource at a node falls below a threshold, the device may adjust the probing schedule to reduce the rate at which the probes are sent. In another embodiment, the device may adjust the probing strategy based on when the probing packets begin experiencing delays. For example, if the probes begin experiencing delays, the device may decrease the probing rate. Conversely, the device may determine that probes should be sent more frequently, with different characteristics (e.g., different sizes, TOC/DHCP information, etc.), to test further strategies.

At step 720, the device may adjust its probing strategy based on the effects of the probing, as described in greater detail above. In particular, the device may adjust the probing strategy so as not to affect legitimate traffic (e.g., by decreasing the probing rate, stopping the probing all together, etc.), to determine whether more information may be gathered via the probing, etc. Notably, a tradeoff may be made between the negative effects that probing has on the network and the amount of information about the network that can be obtained by the probing. In one embodiment, the device may adjust the probing strategy based in part on a usefulness score. Such a score may, for example, be sent by a learning machine that uses the probing results as input and may quantify how much of an impact, if any, the probing results have on the effectiveness of the learning machine to predict future conditions in the network. Procedure 700 then ends at step 725.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide for a selective and dynamic application-centric network measurement infrastructure. In particular, the techniques herein provide several advantages. First, probing is done selectively by keeping track of the attributes of certain critical applications and not according to static configurations. Second, the probe packet themselves may be dynamically crafted to capture the application attributes, so that the measurements obtained from them closely represent the application experience. Third, the timing of probe packet transmissions may be dynamic and done based on a variety of conditions ranging from application characteristics, periods of specific network states, types of applications traversing the network etc. Fourth, this architecture provided herein may allow a network operator to get a fair idea of application experience before the application is rolled out into the network. Fifth, the techniques herein may allow selective probing to be done on a per-destination, per-application basis according to observed statistical distributions of criticality and volume of traffic going to each destination. Sixth, the infrastructure disclosed herein allows for the creation and testing of 'what if' scenarios by using probes crafted and modeled after applications. This gives invaluable insight into the application experience even before it is rolled out into the network.

In contrast to current probing techniques, the techniques herein monitor the network state so as to not add noise to the network when not required and intact not probed when not required, and enable or disable activity autonomously and based on observing the states of many network/router/traffic attributes throughout the day and then making decisions, again autonomously, at the edge. Moreover, traditional probing mechanisms have no control regarding the routes on which probes are sent and can be an unnecessary burden on a network operator because path behaviors change on a continuous basis. By contrast, the techniques herein provide feedback to determine the path on which to obtain measurements and accordingly enabling/disabling on a per-path feedback basis.

In some cases, the techniques herein also provide for the use of reinforcement learning techniques together with probing techniques, where reinforcement learning techniques determines the regions of the observation space that are not well covered by models and/or where the uncertainty of a model is high. In this particular context of network probing, this can allow for dynamically and proactively planning the probing strategy for obtaining the maximum information, without sending unnecessary or irrelevant probes.

While there have been shown and described illustrative embodiments that provide for a selective and dynamic application-centric network measurement infrastructure, it is to be understood that various other adaptations and modifications may be made within the spirit and scope of the embodiments herein. For example, the techniques herein may be adapted for use within any kind of network using learning machines, and is not limited to those mentioned above. Additionally, the protocols discussed herein are exemplary only and other protocols may be used within the scope of the teachings herein.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device in a network, data indicative of traffic characteristics of traffic associated with a particular application;
identifying, by the device, one or more paths in the network via which the traffic associated with the particular application was sent, based on the traffic characteristics;
determining, by the device, a probing schedule based on the traffic characteristics, wherein the probing schedule simulates the traffic associated with the particular application; and
sending, by the device, probes along the one or more identified paths according to the determined probing schedule,
receiving, at the device, result data regarding the sent probes;
determining, by the device, effects of the probes on the network based on the result data; and adjusting, by the device, a probing strategy used by the device based on the effects of the probes on the network, wherein the probing strategy corresponds to at least one of: the probing schedule, the paths via which the probes are sent, or characteristics of the sent probes.

2. The method as in claim 1, wherein the traffic characteristics comprise one or more of: packet size information regarding the traffic, flow duration information regarding the traffic, packet interval information regarding the traffic, or flow interval information regarding the traffic.

3. The method as in claim 1, wherein the probes are sent in response to a determination that a performance metric for application-agnostic probes send along the one or more identified paths is below a threshold value.

4. The method as in claim 1, wherein the effects of the probes correspond to a queue status or an available resource metric of the one or more nodes along the identified paths.

5. The method as in claim 4, further comprising:
adjusting, by the device, the probing schedule to decrease a probing rate of the packets, based on the queue status indicating queuing delays or the available resource metric indicating that available resources of the one or more nodes are below a threshold level.

6. The method as in claim 1, further comprising:
determining, by the device, a usefulness score based on the result data regarding the sent probes; and
adjusting, by the device, the probing strategy used by the device based in part on the usefulness score.

7. The method as in claim 1, wherein the probing schedule is adjusted based on an identified transmission rate of the packets at which the one or more nodes begin experiencing delays.

8. The method as in claim 1, further comprising:
providing, by the device, information obtained from the sent probes to a learning machine process.

9. An apparatus, comprising:
one or more network interfaces to communicate with a network;
a processor coupled to the one or more network interfaces and configured to execute a process; and
a memory configured to store the process executable by the processor, the process when executed operable to:
receive data indicative of traffic characteristics of traffic associated with a particular application;
identify one or more paths in the network via which the traffic associated with the particular application was sent, based on the traffic characteristics;
determine a probing schedule based on the traffic characteristics, wherein the probing schedule simulates the traffic associated with the particular application; and
send probes along the one or more identified paths according to the determined probing schedule,
receive result data regarding the sent probes;
determine effects of the probes on the network based on the result data; and
adjust a probing strategy used by the device based on the effects of the probes on the network, wherein the probing strategy corresponds to at least one of: the probing schedule, the paths via which the probes are sent, or characteristics of the sent probes.

10. The apparatus as in claim 9, wherein the traffic characteristics comprise one or more of: packet size information regarding the traffic, flow duration information regarding the traffic, packet interval information regarding the traffic, or flow interval information regarding the traffic.

11. The apparatus as in claim 9, wherein the probes are sent in response to a determination that a performance metric for application-agnostic probes send along the one or more identified paths is below a threshold value.

12. The apparatus as in claim 9, wherein the effects of the probes correspond to a queue status or an available resource metric of the one or more nodes along the identified paths.

13. The apparatus as in claim 12, wherein the process when executed is further operable to:
adjust the probing schedule to decrease a probing rate of the packets, based on the queue status indicating queuing delays or the available resource metric indicating that available resources of the one or more nodes are below a threshold level.

14. The apparatus as in claim 9, wherein the process when executed is further operable to:
determine a usefulness score based on the result data regarding the sent probes; and
adjust the probing strategy, based in part on the usefulness score.

15. The apparatus as in claim 9, wherein the probing schedule is adjusted based on an identified transmission rate of the packets at which the one or more nodes begin experiencing delays.

16. The apparatus as in claim 9, wherein the process when executed is further operable to:
provide information obtained from the sent probes to a learning machine process.

17. A tangible, non-transitory, computer-readable media having software encoded thereon, the software when executed by a processor on a device in a computer network operable to:
receive data indicative of traffic characteristics of traffic associated with a particular application;
identify one or more paths in the network via which the traffic associated with the particular application was sent, based on the traffic characteristics;
determine a probing schedule based on the traffic characteristics, wherein the probing schedule simulates the traffic associated with the particular application; and
send probes along the one or more identified paths according to the determined probing schedule,
receive result data regarding the sent probes;
determine effects of the probes on the network based on the result data; and
adjust a probing strategy used by the device based on the effects of the probes on the network, wherein the probing strategy corresponds to at least one of: the probing schedule, the paths via which the probes are sent, or characteristics of the sent probes.

* * * * *